(12) United States Patent
Deng et al.

(10) Patent No.: US 7,862,074 B2
(45) Date of Patent: Jan. 4, 2011

(54) ENERGY ABSORPTION SYSTEMS FOR VEHICLES

(75) Inventors: Bing Deng, Shang (CN); James F. Pywell, Shelby Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 4 days.

(21) Appl. No.: 12/248,066

(22) Filed: Oct. 9, 2008

(65) Prior Publication Data
US 2010/0090447 A1   Apr. 15, 2010

(51) Int. Cl.
 *B60R 21/16* (2006.01)
(52) U.S. Cl. .................................. 280/730.1
(58) Field of Classification Search ............... 280/730.1
See application file for complete search history.

(56) References Cited
U.S. PATENT DOCUMENTS

| | | | | |
|---|---|---|---|---|
| 2,834,606 A | * | 5/1958 | Bertrand | .................. 280/730.1 |
| 3,606,377 A | * | 9/1971 | Martin | ..................... 280/741 |
| 3,650,223 A | * | 3/1972 | Kobori | ..................... 108/44 |
| 3,733,088 A | * | 5/1973 | Stephenson | .............. 280/730.1 |
| 5,324,071 A | * | 6/1994 | Gotomyo et al. | ......... 280/730.1 |
| 5,967,603 A | * | 10/1999 | Genders et al. | ........ 297/216.13 |
| 5,975,565 A | * | 11/1999 | Cuevas | ................... 280/730.1 |
| 6,113,132 A | * | 9/2000 | Saslecov | ................. 280/730.1 |
| 7,222,877 B2 | * | 5/2007 | Wipasuramonton et al. | ...... 280/730.1 |

* cited by examiner

*Primary Examiner*—Faye M. Fleming
(74) *Attorney, Agent, or Firm*—Quinn Law Group, PLLC

(57) ABSTRACT

A vehicle includes an energy absorber that is positionable rearward of a passenger seat to absorb energy from a force having a forward component and being directed toward the rear surface of the passenger seat. In one exemplary embodiment, the energy absorber is a cellular material. In another exemplary embodiment, the energy absorber is a selectively inflatable cushion. A corresponding seat assembly is also provided.

8 Claims, 7 Drawing Sheets

ENERGY ABSORPTION SYSTEMS FOR VEHICLES

TECHNICAL FIELD

This invention relates to vehicular impact energy absorption systems.

BACKGROUND OF THE INVENTION

Vehicles often include multiple rows of seating. For example, many vehicles include two or more rows of seating, each of the rows being spaced fore and aft with respect to each other in the vehicle body.

SUMMARY OF THE INVENTION

A vehicle includes a vehicle body defining a passenger compartment, a first seat assembly mounted with respect to the vehicle body, and a second seat assembly mounted with respect to the vehicle body rearward of the first seat assembly. The first seat assembly includes a seatback portion having a frame. An energy absorber is mounted with respect to the vehicle body and is positionable between the frame of the seatback portion and the second seat assembly. In an exemplary embodiment, the energy absorber is a crushable foam. In another exemplary embodiment, the energy absorber is a selectively inflatable cushion that is mounted with respect to the seatback portion of the first seat assembly. In yet another exemplary embodiment, the energy absorber is a roof-mounted, selectively inflatable cushion.

A corresponding vehicle seat is also provided. The vehicle seat includes a lower seat portion and a seatback portion that is operatively connected to the lower seat portion, has a frame, and is characterized by a rear surface. An energy absorber is mounted with respect to the frame and is positionable behind the frame to absorb energy from a force having a forward component directed toward the rear surface.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
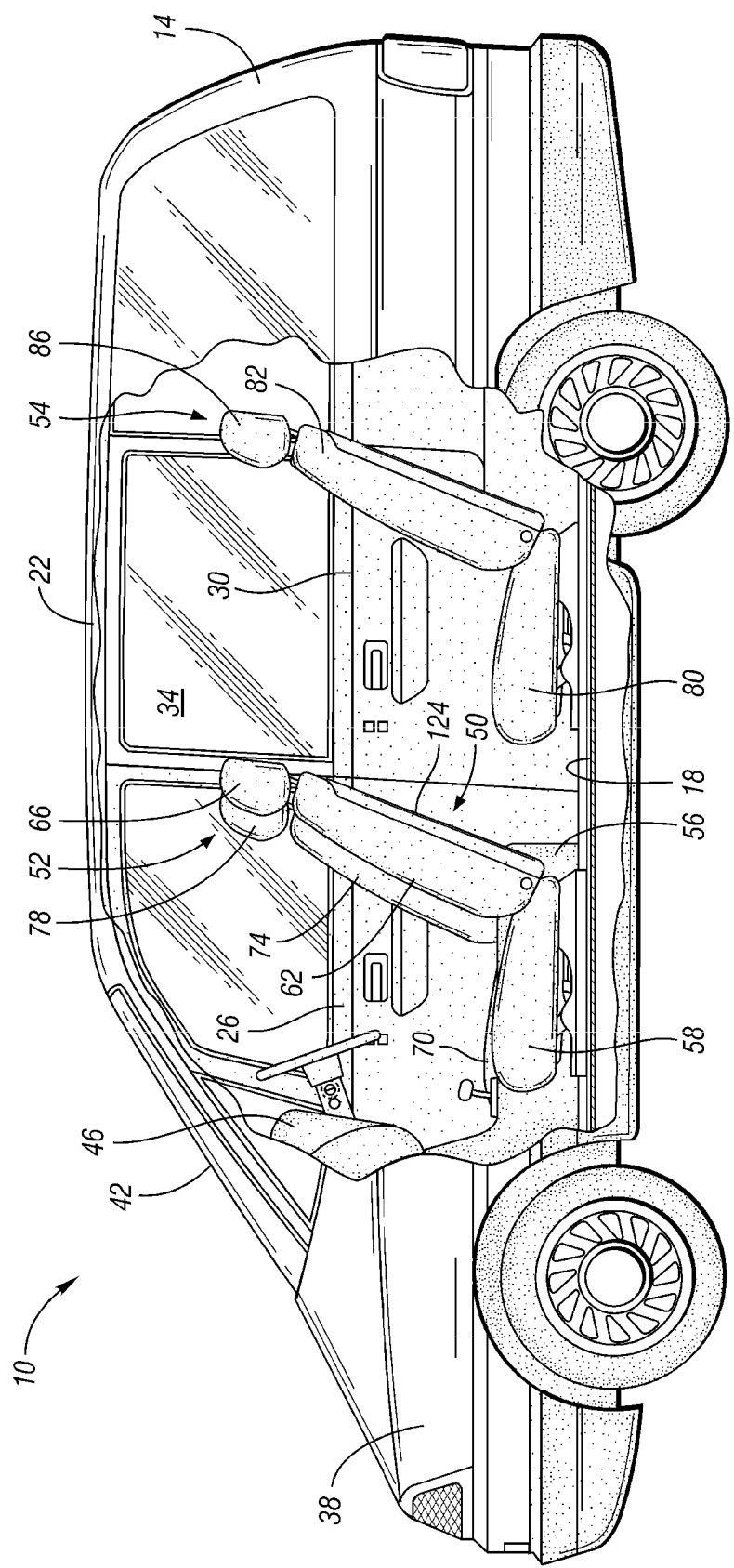
FIG. 1 is a schematic, partial cutaway, side view of a vehicle having front and rear seat assemblies.

Referring to FIG. 1, a vehicle 10 is schematically depicted. The vehicle 10 includes a vehicle body 14. In the embodiment depicted, the vehicle body 14 has a minivan configuration; those skilled in the art will recognize a variety of other body styles and configurations that may be employed within the scope of the claimed invention, such as sedan, coupe, hatchback, pickup truck, sport utility, etc. The vehicle body 14 includes a floor 18, a roof 22, a front side door 26, and a rear side door 30. The floor 18 and the roof 22 cooperate to partially define a passenger compartment 34. At the forward end of the vehicle 10, the body 14 includes fenders 38 and a windshield 42, as understood by those skilled in the art. An instrument panel 46 is mounted at the forward end of the passenger compartment 34.

The vehicle 10 includes a plurality of seat assemblies mounted with respect to the floor 18 for supporting vehicle occupants (not shown) within the passenger compartment 34. A front row of seating includes seat assembly 50 and seat assembly 52. Seat assembly 52 is positioned laterally with respect to seat assembly 50. The vehicle 10 also includes a rear row of seating, including at least seat assembly 54, which is rearward of the front row of seating. Seat assembly 54 is positioned rearward of seat assemblies 50, 52, and, in the embodiment depicted, seat assembly 54 is directly rearward of, i.e., directly behind, seat assembly 50. In one exemplary embodiment, seat assembly 54 is a bench seat that extends transversely across the passenger compartment 34, that defines the entire rear row of seating, and that can accommodate a plurality of rear occupants. Such a bench seat would have a portion that is directly rearward of seat assembly 50 and another portion that is directly rearward of seat assembly 52. In another exemplary embodiment, the rear row of seating includes one more other seat assemblies placed to the side of seat assembly 54. For example, a fourth seat assembly (not shown) may be directly rearward of seat assembly 52.

As understood by those skilled in the art, seat assemblies 50, 52, 54 may be mounted to the floor 18 via tracks or rails such that the seat assemblies 50, 52, 54 are selectively movable by an occupant. Seat assembly 50 and seat assembly 52 are spaced apart from one another in the transverse direction. A center console 56 is mounted with respect to the floor 18 such that the center console 56 is disposed between the two front seat assemblies 50, 52. The center console 56 may, for example, function as an armrest for front row occupants, and may define a storage chamber (not shown).

Figure 2:
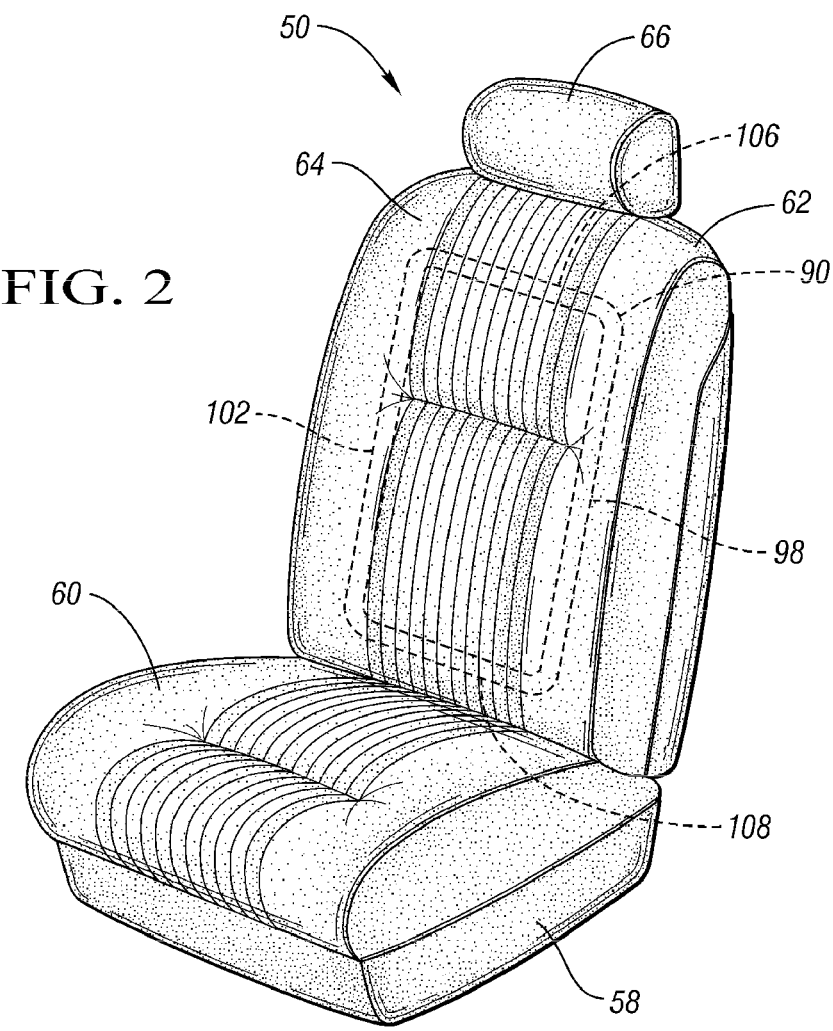
FIG. 2 is a schematic, perspective view of one of the front seat assemblies of FIG. 1.

Referring to FIGS. 1 and 2, seat assembly 50 includes a lower seat portion 58, which includes a generally upward facing surface 60 for supporting an occupant above the floor 18. Seat assembly 50 also includes a seatback portion 62, which is operatively connected to the lower seat portion 58 and which provides a forward-facing surface 64 for supporting the back of an occupant. In the embodiment depicted, seat assembly 50 also includes a head restraint 66, which is mounted to the seatback portion 62.

Referring to FIG. 1, seat assembly 52 similarly includes a lower seat portion 70 having a generally upward facing surface for supporting an occupant above the floor 18, a seatback portion 74 that is operatively connected to the lower seat portion 70 and that provides a surface for supporting the back of an occupant, and a head restraint 78 that is mounted to the seatback portion 74. Seat assembly 54 likewise includes a lower seat portion 80 having a generally upward facing surface for supporting an occupant above the floor 18, a seatback portion 82 that is operatively connected to the lower seat portion 80 and that provides a surface for supporting the back of an occupant, and a head restraint 86 that is mounted to the seatback portion 82.

In the embodiment depicted, the lower seat portions 58, 70, 80 and the seatback portions 62, 74, 82 are separate members; the seatback portions 62, 74, 82 are selectively pivotable with respect to the lower seat portions 58, 70, 80 to vary the reclination angles of the seat assemblies 50, 52, 54 as understood by those skilled in the art.

Figure 3:
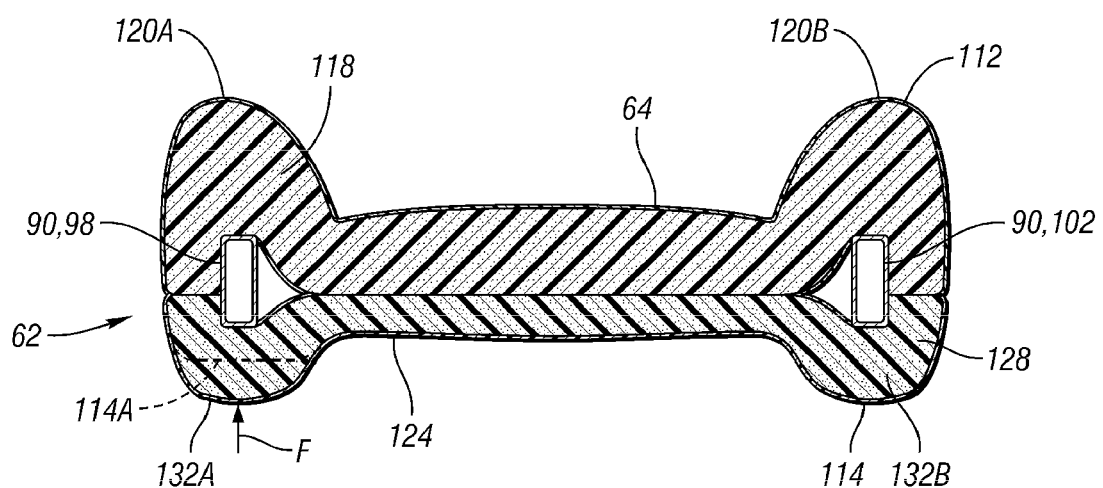
FIG. 3 is a schematic, cross-sectional view of the seat assembly of FIG. 2 taken about a horizontal plane.

Referring to FIGS. 2 and 3, the seatback portion 62 of seat assembly 50 includes a frame 90 that provides the seatback portion 62 with structural rigidity, as understood by those skilled in the art. In the embodiment depicted, the frame includes two rails 98, 102 that are interconnected by two or more cross members 106, 108. Those skilled in the art will recognize a variety of other frame configurations that may be employed to provide structural rigidity and support to the seatback portion 62 within the scope of the claimed invention.

The seatback portion 62 also includes one or more flexible covers that define the exterior surfaces of the seatback portion 62. In the embodiment depicted, two covers 112, 114 define the exterior surfaces of the seatback portion 62. Cover 112 defines front surface 64, which is configured to contact the back of an occupant of the seat assembly 50. Those skilled in the art will recognize a variety of materials that may be used to form cover 112, such as cloth, leather, vinyl, etc. A foam pad 118 is between the cover 112 and the frame 90 to isolate the frame 90 from the occupant of the seat assembly 50. The foam pad 118 and the cover 112 in the embodiment depicted define side bolsters 120A, 120B, which provide lateral support to an occupant.

Cover 114 defines the rear surface 124 of the seatback portion 62. Surface 124 faces the seat assembly shown at 54 in FIG. 1. An energy absorber 128 is mounted with respect to the vehicle body 14, and, more specifically, in the embodiment depicted, is positioned between the cover 114 and the frame 90, and thus at least part of the energy absorber 128 is between the frame 90 and the seat assembly shown at 54 in FIG. 1. The energy absorber 128 is configured to deform when subjected to stress, and thereby absorb energy.

More specifically, the energy absorber 128 is configured to deform, and thereby absorb energy, when subjected to stress resulting from an impact force F having a forward component exerted on the surface 124. The cover 114 transfers the force F to the energy absorber 128. The frame 90 exerts a reaction force on the energy absorber 128, resulting in compressive stress on the energy absorber 128. The resulting compressive stress causes deformation of the energy absorber 128 so that the cover 114 is displaced to the position shown in phantom at 114A. Thus, the energy absorber absorbs energy from impact force F.

In an exemplary embodiment, the energy absorber 128 plastically deforms in response to the force F. Those skilled in the art will recognize a variety of energy absorbers 128 that may be employed within the scope of the claimed invention, including, for example, cellular materials such as high density, crushable foam blocks, aluminum honeycomb, other cellular material, etc. Polymeric energy absorbing foam may, for example, be polyurethane or polypropylene.

In the embodiment depicted, the energy absorber 128 is locally thickened directly rearward of frame members 98, 102, such that the energy absorber 128 defines protuberances 132A, 132B. Referring to FIGS. 1 and 2, seatback portion 62 is representative of the seatback portion 74 of seat assembly 52.

Figure 4A:
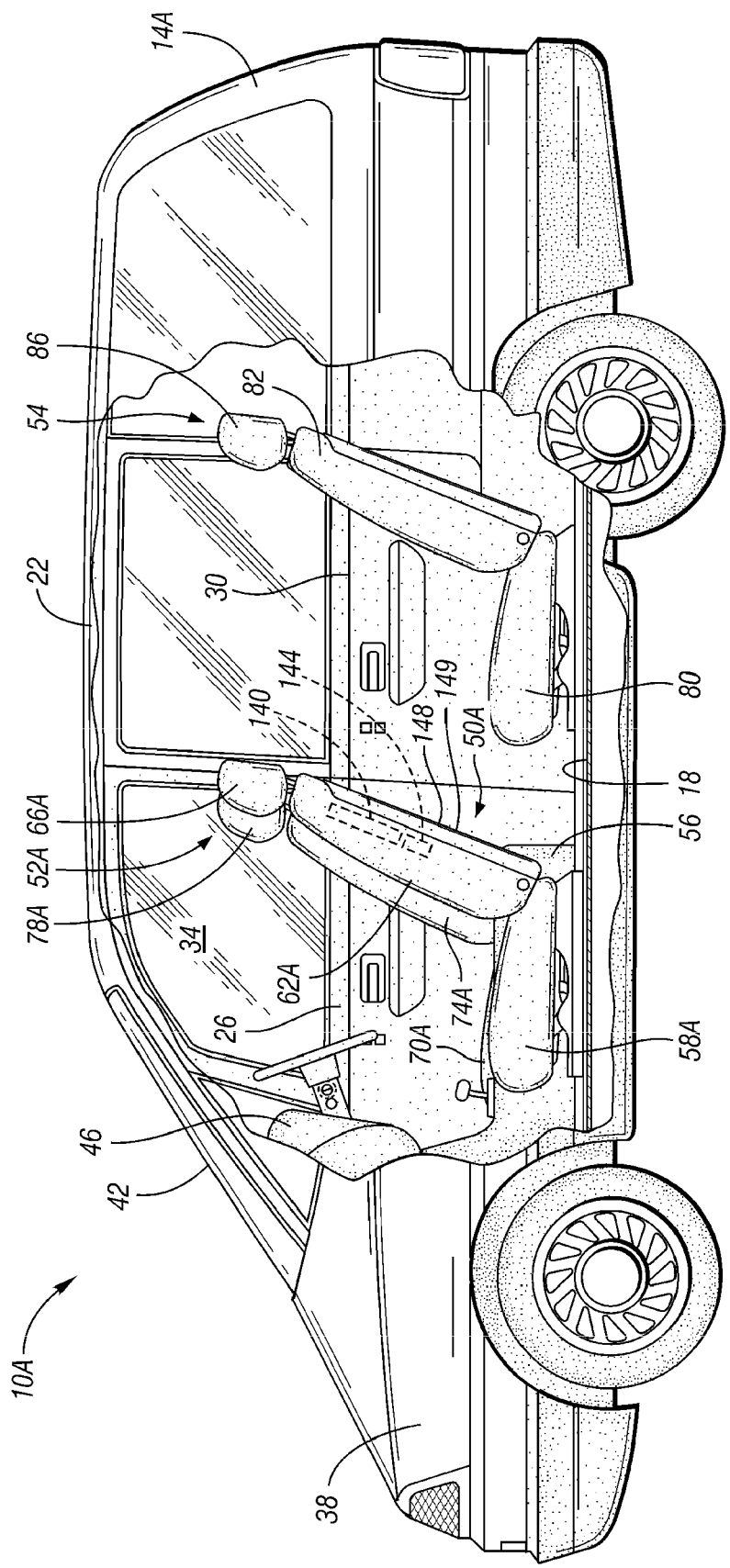
FIG. 4A is a schematic, partial cutaway, side view of another vehicle having front and rear seat assemblies and a selectively deployable airbag in a stowed configuration.

Referring to FIG. 4A, wherein like reference numbers refer to like components from FIGS. 1-3, vehicle 10A includes vehicle body 14A. The vehicle body 14A includes a floor 18, a roof 22, a front side door 26, and a rear side door 30. The floor 18 and the roof 22 cooperate to partially define a passenger compartment 34. At the forward end of the vehicle 10A, the body 14A includes fenders 38 and a windshield 42, as understood by those skilled in the art. An instrument panel 46 is mounted at the forward end of the passenger compartment 34.

The vehicle 10A includes a plurality of seat assemblies mounted with respect to the floor 18 for supporting vehicle occupants (not shown) within the passenger compartment 34. The vehicle includes a front row of seating and a rear row of seating. The front row of seating includes seat assembly 50A and seat assembly 52A. Seat assembly 52A is positioned laterally with respect to seat assembly 50A. The rear row of seating includes at least seat assembly 54. Seat assembly 54 is directly rearward of seat assembly 50A.

Seat assembly 50A includes a lower seat portion 58A, which includes a generally upward facing surface for supporting an occupant above the floor 18. Seat assembly 50A also includes a seatback portion 62A, which is operatively connected to the lower seat portion 58A and which provides a forward-facing surface for supporting the back of an occupant. In the embodiment depicted, seat assembly 50A also includes a head restraint 66A, which is mounted to the seatback portion 62A.

Seat assembly 52A similarly includes a lower seat portion 70A having a generally upward facing surface for supporting an occupant above the floor 18, a seatback portion 74A that is operatively connected to the lower seat portion 70A and that provides a surface for supporting the back of an occupant, and a head restraint 78A that is mounted to the seatback portion 74A. Seat assembly 54 likewise includes a lower seat portion 80 having a generally upward facing surface for supporting an occupant above the floor 18, a seatback portion 82 that is operatively connected to the lower seat portion 80 and that provides a surface for supporting the back of an occupant, and a head restraint 86 that is mounted to the seatback portion 82.

Figure 4B:
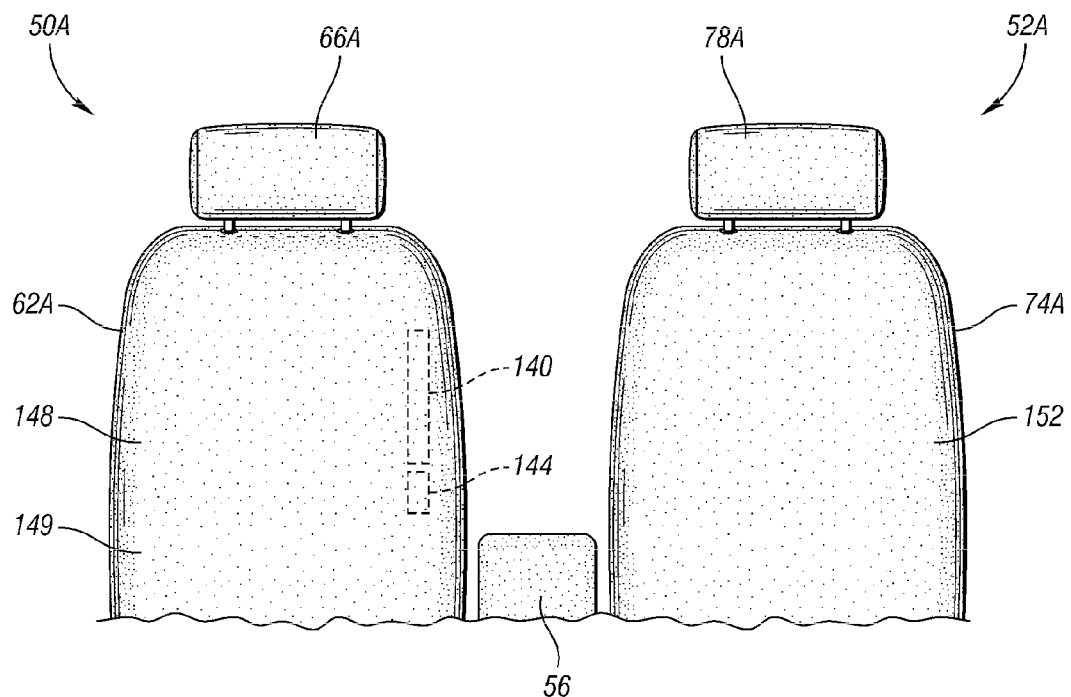
FIG. 4B is a schematic rear view of the front seat assemblies of FIG. 4A with the airbag in the stowed configuration.
Figure 5B:
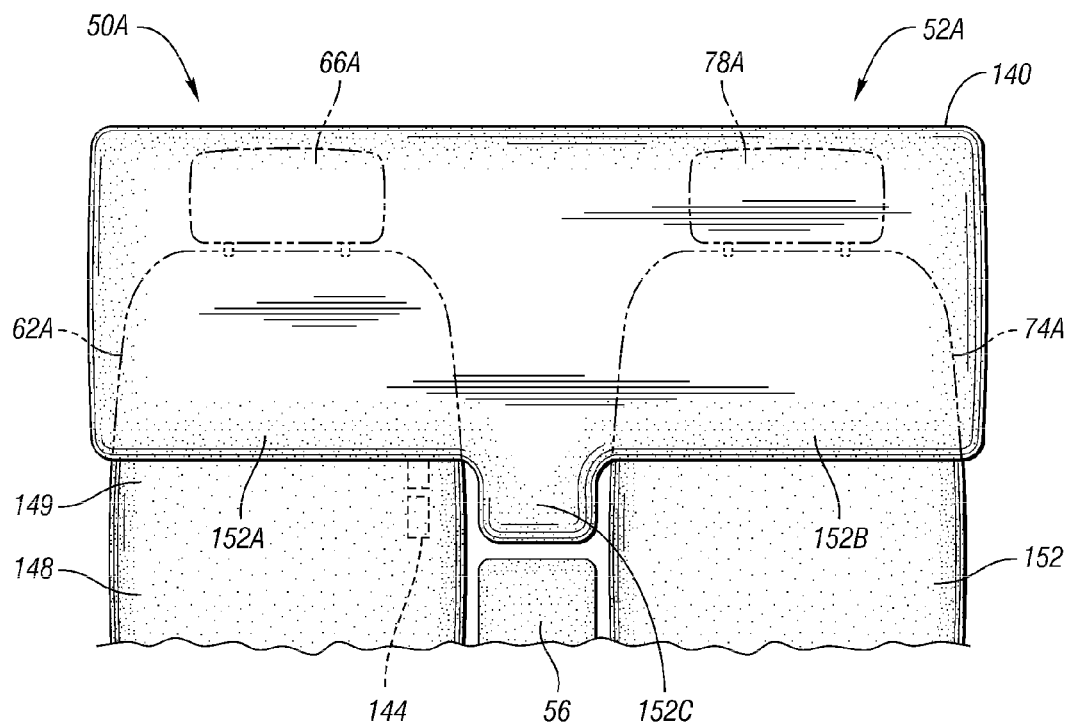
FIG. 5B is a schematic rear view of the front seat assemblies of FIG. 4B with the airbag in the deployed configuration.
Figure 5A:
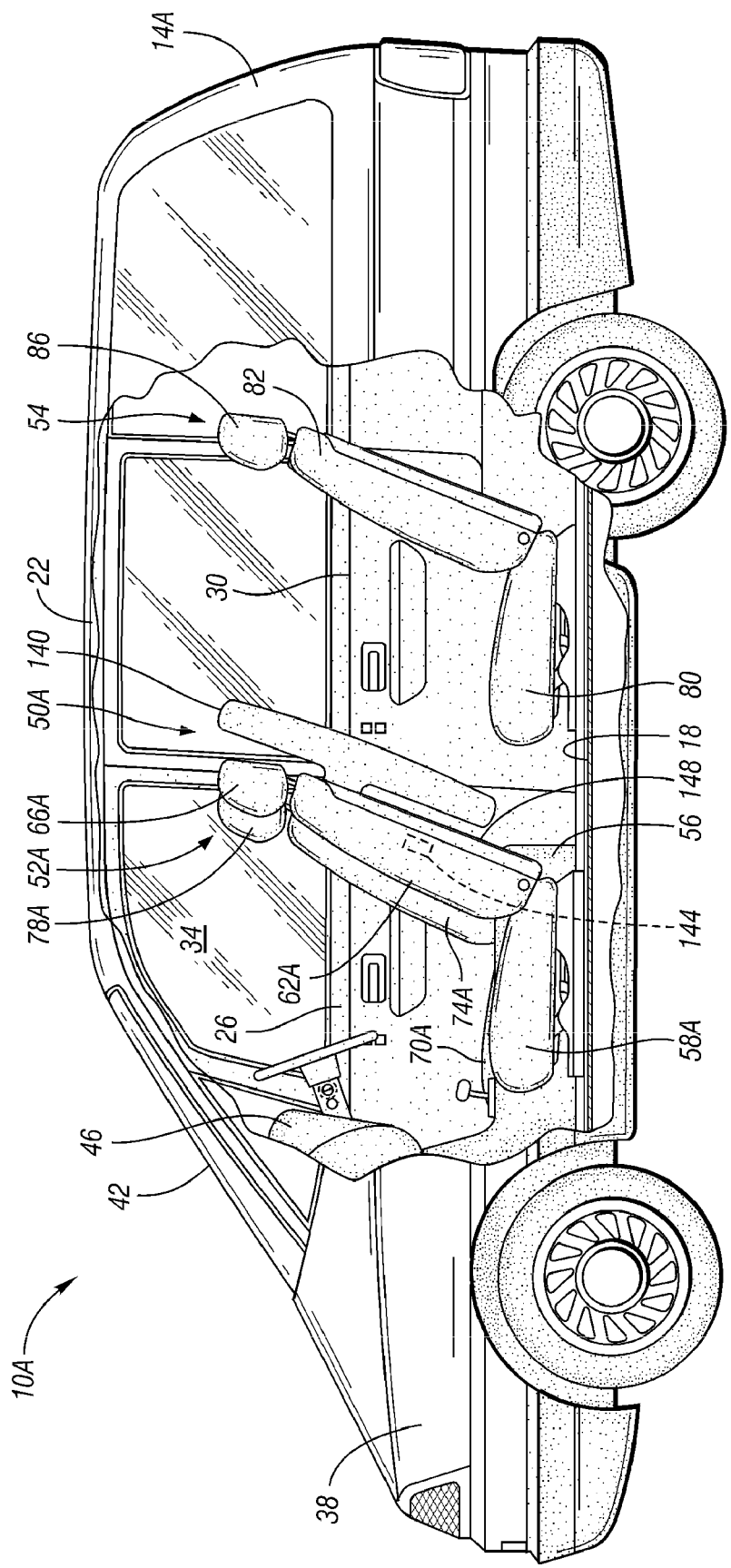
FIG. 5A is a schematic, partial cutaway, side view of the vehicle of FIG. 4A with the airbag in a deployed configuration.

Vehicle 10A also includes an energy absorber, namely, selectively inflatable cushion 140, i.e., an airbag. The cushion 140 is mounted with respect to the body 14A at seatback portion 62A. The cushion 140 is characterized by a deflated, stowed configuration, as shown in FIGS. 4A and 4B, and an inflated, deployed configuration, as shown in FIGS. 5A and 5B. An inflator 144 is operatively connected to the cushion 140 and is configured to selectively inflate the cushion 140. More specifically, the inflator 144 and the cushion 140 are mounted with respect to the frame of the seatback portion 62A at the upper, inboard corner of the seatback portion 62A. The frame of the seatback portion 62A is similar to the one shown at 90 in FIG. 2.

Referring to FIGS. 4A and 4B, when the inflatable cushion 140 is in the stowed configuration, it is entirely within the seatback portion 62A, such that the cushion 140 is forward of the rear cover 148 of the seatback portion 62A. Rear cover 148 defines the rearward surface 149 of the seatback portion 62A. Rearward surface 149 faces seat assembly 54. The rear cover 148 is characterized by a tear seam (not shown) or the like, through which the cushion 140 is selectively expandable from the stowed configuration to the deployed configuration.

When the cushion 140 is inflated, its expands through the tear seam in the rear cover 148 to the deployed configuration, as shown in FIGS. 5A and 5B. Referring to FIGS. 5A and 5B, when the cushion 140 is inflated and in the deployed configuration, a portion 152A of the cushion 140 is directly rearward of the seatback portion 62A, and is between the rearward surface 149 of seatback portion 62A and the rear seat assembly 54. In the embodiment depicted, portion 152A of the deployed cushion is also directly rearward of the head restraint 66A, and is between the head restraint 66A and the rear seat assembly 54.

During deployment, the cushion 140 expands laterally, i.e., transversely with respect to the vehicle body 14A, such that, when the cushion 140 is in the deployed configuration, a portion 152B of the cushion 140 is directly rearward of the seatback portion 74A and the head restraint 78A. Thus, portion 152B is between the seatback portion 74A and any seat assembly that may be directly behind seat assembly 52A.

Center console 56 is mounted to the floor 18 and is between the front seat assemblies 50A, 52A. Cushion 140 includes a portion 152C that interconnects portions 152A, 152B. Portion 152C is directly rearward of the space between the seat assemblies 50A, 52A. When the cushion 140 is in the deployed configuration, portion 152C is characterized by a larger height dimension than portions 152A and 152B.

Figure 6:
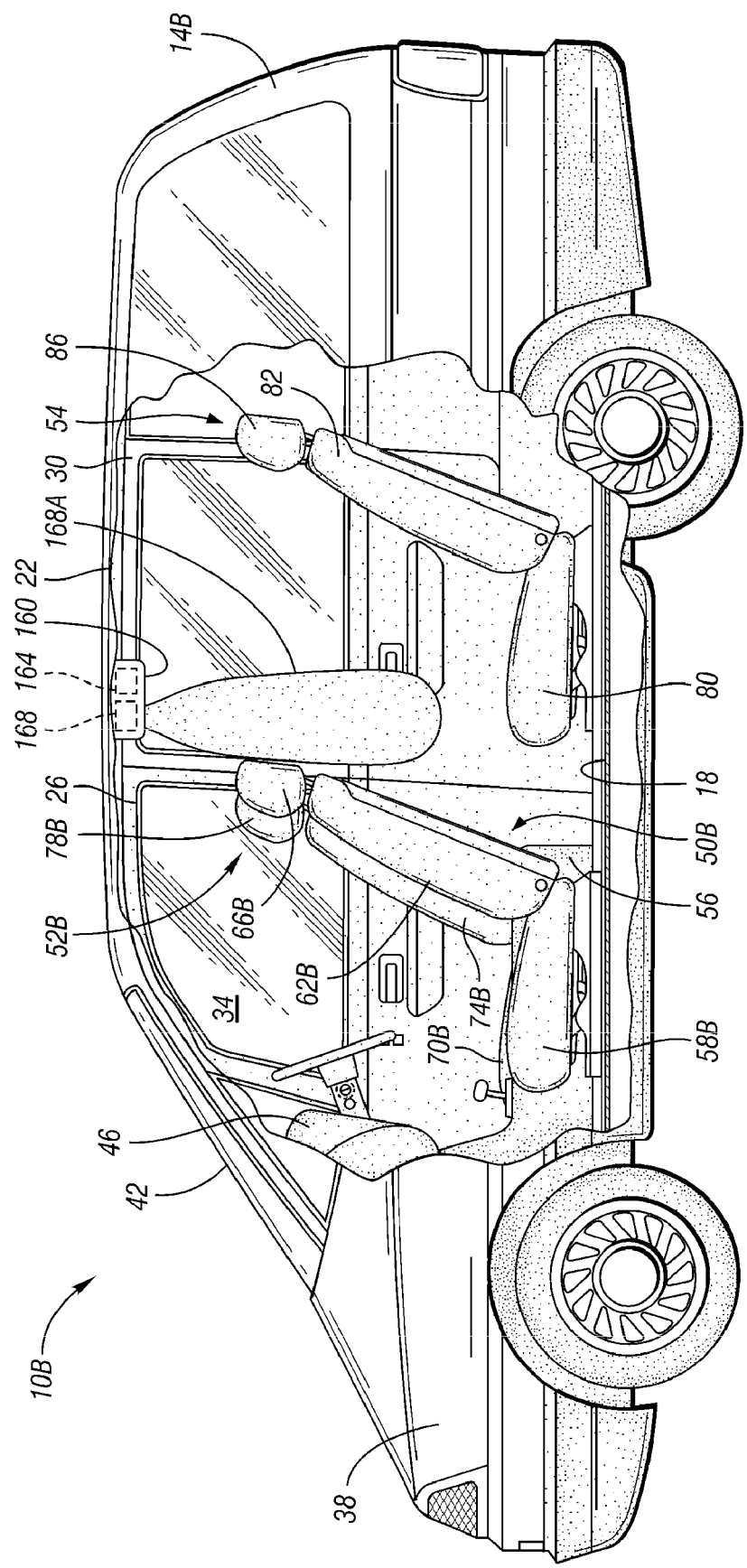
FIG. 6 is a schematic, partial cutaway, side view of yet another vehicle having front and rear seat assemblies and a selectively deployable airbag.

Referring to FIG. 6, wherein like reference numbers refer to like components from FIGS. 1-5B, vehicle 10B includes vehicle body 14B. The vehicle body 14B includes a floor 18, a roof 22, a front side door 26, and a rear side door 30. The floor 18 and the roof 22 cooperate to partially define a passenger compartment 34. At the forward end of the vehicle 10B, the body 14B includes fenders 38 and a windshield 42, as understood by those skilled in the art. An instrument panel 46 is mounted at the forward end of the passenger compartment 34.

The vehicle 10B includes a plurality of seat assemblies mounted with respect to the floor 18 for supporting vehicle occupants (not shown) within the passenger compartment 34. The vehicle includes a front row of seating and a rear row of seating. The front row of seating includes seat assembly 50B and seat assembly 52B. Seat assembly 52B is positioned laterally with respect to seat assembly 50B. The rear row of seating includes at least seat assembly 54, which is positioned rearward of seat assemblies 50B, 52B, and, in the embodiment depicted, seat assembly 54 is directly rearward of seat assembly 50B.

Seat assembly 50B includes a lower seat portion 58B, which includes a generally upward facing surface for supporting an occupant above the floor 18. Seat assembly 50B also includes a seatback portion 62B, which is operatively connected to the lower seat portion 58B and which provides a forward-facing surface for supporting the back of an occupant. In the embodiment depicted, seat assembly 50B also includes a head restraint 66B, which is mounted to the seatback portion 62B.

Seat assembly 52B similarly includes a lower seat portion 70B having a generally upward facing surface for supporting an occupant above the floor 18, a seatback portion 74B that is operatively connected to the lower seat portion 70B and that provides a surface for supporting the back of an occupant, and a head restraint 78B that is mounted to the seatback portion 74B. Seat assembly 54 likewise includes a lower seat portion 80 having a generally upward facing surface for supporting an occupant above the floor 18, a seatback portion 82 that is operatively connected to the lower seat portion 80 and that provides a surface for supporting the back of an occupant, and a head restraint 86 that is mounted to the seatback portion 82.

Vehicle 10B also includes an energy absorber assembly having a housing 160, an inflator 164, and a selectively inflatable cushion 168, i.e., an airbag. The cushion 168 is mounted with respect to the body 14B at the roof 22. The cushion 168 is characterized by a deflated, stowed configuration, as shown at 168, and an inflated, deployed configuration, at 168A. The inflator 164 is operatively connected to the cushion 168 and is configured to selectively inflate the cushion 168.

When the cushion 168 is in the stowed, deflated configuration, the cushion 168 is stored in the housing 160 adjacent the roof 22, and is entirely above the seat assemblies 50B, 52B, 54. The inflator 164 is configured to selectively inflate the cushion 168 such that the cushion expands to the inflated, deployed configuration shown at 168A. In the deployed configuration, the cushion 168A extends downward from the housing 160 such that at least a portion of the cushion is directly rearward of the seatback portion 62B and the head restraint 66B, and is thus between the seatback portion 62B and the rear seat assembly 54. In an exemplary embodiment, the cushion 168A is sufficiently wide such that a portion of the cushion 168A is directly rearward of the seatback portion 74B and head restraint 78B of seat assembly 52B.

Figure 7:
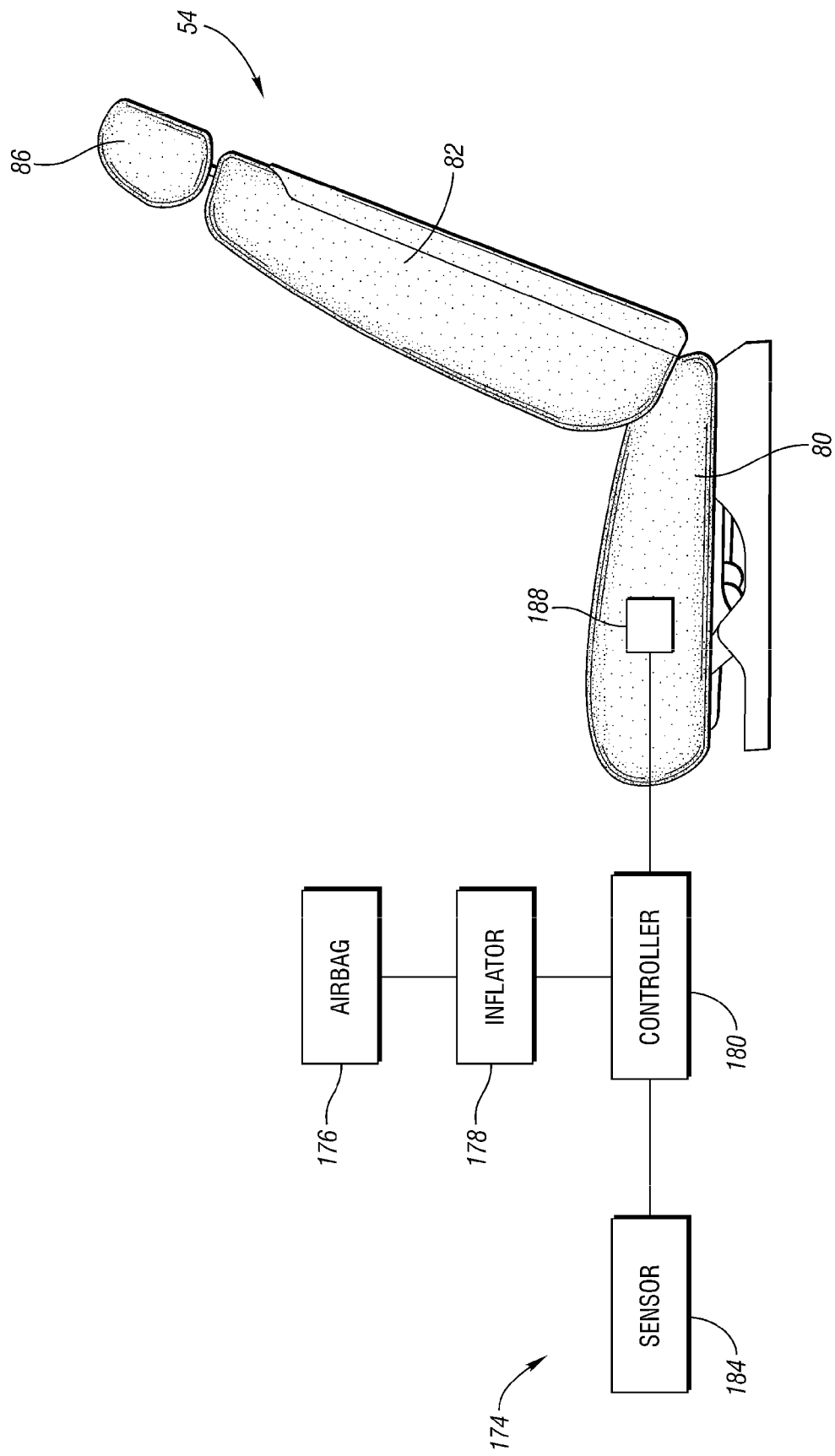
FIG. 7 is a schematic, side view of a control system for use with the airbags of FIGS. 4A-6.

Each of the vehicles 10A, 10B (shown in FIGS. 4A and 6, respectively) includes a control system as shown at 174 in FIG. 7. Referring to FIG. 7, the control system 174 is configured to control the deployment of a selectively inflatable cushion 176 via inflator 178. Cushion 176 is representative of the cushion shown at 140 in FIG. 4A and the cushion shown at 168 in FIG. 6. Inflator 178 is representative of the inflator shown at 144 in FIG. 4A and the inflator shown at 164 in FIG. 6.

The control system 174 includes a controller 180. A "controller" may include one or more controllers that cooperate together. The controller 180 is a digital controller in the embodiment depicted, although any controller configuration may be used within the scope of the claimed invention.

The control system 174 is configured to detect a frontal impact to the vehicle body. More specifically, the control system 174 includes at least one sensor 184 that is configured to detect a frontal impact to the vehicle body. The controller 180 is operatively connected to the at least one sensor 184 to receive signals from the at least one sensor 184 that indicate whether or not there is a frontal impact to the vehicle body. Those skilled in the art will recognize a variety of sensors that may be employed to detect a frontal impact to the vehicle body that may be employed within the scope of the claimed invention. In an exemplary embodiment, the at least one sensor 184 is a frontal impact sensor, as understood by those skilled in the art, that is also used to deploy a driver airbag (not shown) and a front passenger airbag (not shown).

The control system 174 also includes one or more occupant detection sensors 188 configured to detect the presence of an occupant in the rear row of seating, including at least seat assembly 54. In an exemplary embodiment, sensors 188 include a pressure sensor in the lower seat portion 80 of seat assembly 54. Other sensor configurations that detect the presence of an occupant in the rear row of seating may be employed within the scope of the claimed invention. The sensor 188 communicates to the controller 180 whether there is an occupant in the rear row of seating.

The controller 180 is configured to determine, based on signals (or lack of signals) from sensors 188, whether there is an occupant in the rear row of seating. If the controller determines, based on sensors 188, that there is not an occupant in the rear row of seating, then the controller 180 disables the inflator 178. If the controller 180 determines, based on sensors 188, that there is an occupant in the rear row of seating, then the controller determines whether sensors 184 indicate a frontal impact to the vehicle body. If the controller 180 determines that sensors 184 do not indicate a frontal impact, then the controller 180 disables the inflator 178. If the controller 180 determines that the sensors 184 indicate a frontal impact, then the controller 180 causes the inflator 178 to inflate the cushion 176, thus causing the cushion 176 to expand from its stowed configuration to its deployed configuration.

Thus, the control system 174 is configured such that the cushion 176 will deploy only if there is an occupant in the rear row of seating and the vehicle body is in a frontal impact situation.

In an exemplary embodiment, the inflator 178, and thus inflators 144 and 164) are cold gas inflators, i.e., they do not rely on combustion or pyrotechnics. For example, inflators 178, 144, 164 may be tanks of compressed gas.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a vehicle body defining a passenger compartment;
a first seat assembly mounted with respect to the vehicle body, said first seat assembly including a first seatback portion having a frame;
a second seat assembly mounted with respect to the vehicle body rearward of the first seat assembly;
an energy absorber mounted with respect to the first seatback portion and being positionable between the frame of the first seatback portion and the second seat assembly;
wherein the energy absorber is a selectively inflatable restraint cushion mounted with respect to the vehicle body;
wherein the cushion is selectively inflatable from a stowed configuration to a deployed configuration;
wherein the cushion in the deployed configuration is between the first seatback portion and the second seat assembly;
wherein the vehicle includes a third seat assembly forward of the second seat assembly and laterally positioned with respect to the first seat assembly;
wherein the third seat assembly includes a second seatback portion; and
wherein the cushion in the deployed configuration extends laterally such that a first portion of the cushion is directly rearward of the first seatback portion and a second portion of the cushion is directly rearward of the second seatback portion.

2. The vehicle of claim 1, further comprising:
a second energy absorber mounted with respect to the first seatback portion and being positionable between the frame of the first seatback portion and the second seat assembly;
wherein the first seatback portion includes a cover; and wherein the second energy absorber is between the cover and the frame;
wherein the second energy absorber is material configured to absorb energy from an impact; and
wherein the material is plastically deformable against the frame.

3. The vehicle of claim 2, wherein the material is a cellular material.

4. The vehicle of claim 3, wherein the material is polymeric foam.

5. The vehicle of claim 2, wherein the material at least partially defines protuberances on the rearward side of the first seatback portion.

6. The vehicle of claim 1, further comprising:
an inflator operative to selectively inflate the cushion; and
a sensor configured to detect the presence of an occupant in the second seat assembly;
wherein the sensor is operatively connected to the inflator such that the inflator only inflates the cushion if the sensor detects the presence of an occupant in the second seat assembly and wherein the inflator is a cold gas inflator.

7. A vehicle comprising:
a vehicle body defining a passenger compartment;
a first seat assembly mounted with respect to the vehicle body, said first seat assembly including a first seatback portion having a frame;
a second seat assembly mounted with respect to the vehicle body rearward of the first seat assembly;
an energy absorber mounted with respect to the vehicle body and being positionable between the frame of the first seatback portion and the second seat assembly;
wherein the energy absorber is a selectively inflatable restraint cushion mounted with respect to the vehicle body, wherein the cushion is selectively inflatable from a stowed configuration to a deployed configuration, and wherein the cushion in the deployed configuration is between the first seatback portion and the second seat assembly;
wherein the vehicle includes a third seat assembly forward of the second seat assembly and laterally positioned with respect to the first seat assembly, wherein the third seat assembly includes a second seatback portion, and wherein the cushion in the deployed configuration extends laterally such that a first portion of the cushion is directly rearward of the first seatback portion and a second portion of the cushion is directly rearward of the second seatback portion;
wherein the first seat assembly and the third seat assembly are spaced a distance apart from one another;
wherein the vehicle further includes a console between the first seat assembly and the third seat assembly;
wherein the cushion in the deployed configuration includes a third portion between the first and second portions; and
wherein the third portion of the cushion is characterized by a greater height dimension than the first and second portions when the cushion is in the deployed configuration.

8. The vehicle of claim 7, further comprising:
an inflator operative to selectively inflate the cushion; and
a sensor configured to detect the presence of an occupant in the second seat assembly;
wherein the sensor is operatively connected to the inflator such that the inflator only inflates the cushion if the sensor detects the presence of an occupant in the second seat assembly and wherein the inflator is a cold gas inflator.

* * * * *